United States Patent [19]

Brown

[11] 4,316,395
[45] Feb. 23, 1982

[54] CONTROL APPARATUS FOR DRIVE TRANSMISSIONS

[76] Inventor: Derek Brown, 7 Southlands, Eighton Bank, Gateshead, Tyne & Wear, England

[21] Appl. No.: 87,931

[22] Filed: Oct. 25, 1979

[30] Foreign Application Priority Data

Oct. 26, 1978 [GB] United Kingdom ............... 42001/78
Jun. 5, 1979 [GB] United Kingdom ............... 19542/79

[51] Int. Cl.³ ..................... B60K 41/06; B60K 41/04
[52] U.S. Cl. .................................. 74/866; 74/752 D
[58] Field of Search ................ 74/866, 867, 862, 861, 74/878, 752 A, 752 D, 752 C

[56] References Cited

U.S. PATENT DOCUMENTS

| | | | |
|---|---|---|---|
| 3,122,940 | 3/1964 | Shimwell et al. | 74/866 |
| 3,530,668 | 9/1970 | Siebers et al. | 74/866 X |
| 3,710,647 | 1/1973 | Dach et al. | 74/866 X |
| 3,726,159 | 4/1973 | Mizota | 74/752 D |
| 3,732,755 | 5/1973 | Beig | 74/866 |
| 3,805,640 | 4/1974 | Schneider et al. | 74/866 |
| 3,885,447 | 5/1975 | Braun et al. | 74/336 |
| 3,961,546 | 6/1976 | Gilmore | 74/866 |
| 4,027,554 | 6/1977 | Ito et al. | 74/866 |
| 4,139,015 | 2/1979 | Sakai | 74/867 |
| 4,185,521 | 1/1980 | Beals | 74/861 X |
| 4,223,573 | 9/1980 | Franssen | 74/866 X |

FOREIGN PATENT DOCUMENTS

| | | |
|---|---|---|
| 2635804 | 3/1977 | Fed. Rep. of Germany ........ 74/878 |
| 2345010 | 3/1974 | France . |
| 2307197 | 4/1974 | France . |
| 2349071 | 11/1977 | France . |
| 880619 | 12/1959 | United Kingdom . |
| 1161341 | 8/1969 | United Kingdom . |
| 1174701 | 12/1969 | United Kingdom . |
| 1440083 | 6/1976 | United Kingdom . |
| 1475322 | 6/1977 | United Kingdom . |
| 1481673 | 8/1977 | United Kingdom . |
| 1484360 | 9/1977 | United Kingdom . |
| 1506194 | 4/1978 | United Kingdom . |
| 1514972 | 6/1978 | United Kingdom . |
| 1525302 | 9/1978 | United Kingdom . |
| 1543388 | 4/1979 | United Kingdom . |

Primary Examiner—Leslie Braun
Attorney, Agent, or Firm—Holman & Stern

[57] ABSTRACT

Control apparatus for a drive transmission such as the hydraulic drive transmission of a fork lift truck is provided in which an electrical signal is developed having a frequency representative of the rate of rotation of the drive shaft of the transmission. A first switching circuit is controlled in response to the said signal so as to remain in one state thereof during each cycle of the said signal when the duration of the cycle is less than a predetermined duration, and to be settable in another state thereof by actuation of a manually operable direction switch, serving as a forward-reverse drive selector lever, when the duration of the said cycle is greater than the said predetermined duration. A second switching circuit is so controlled in response to the said signal as to be set into one state thereof in response to a cycle of the said signal when the duration of the said cycle falls below a second predetermined duration, and to be set into another state thereof when the duration of the said cycle increases to exceed a third predetermined duration. The second switching circuit effects energization of a low gear ratio electrical actuator or a high gear ratio electrical actuator respectively depending upon which one of the said two states of the second switching means prevails.

8 Claims, 14 Drawing Figures

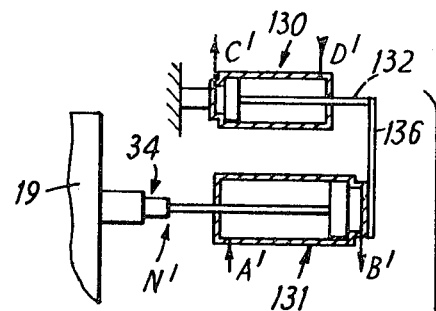
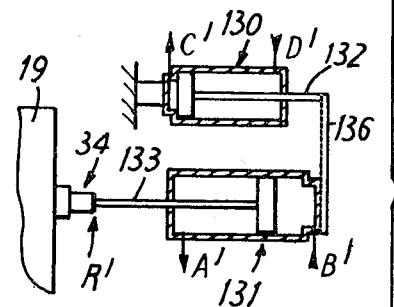
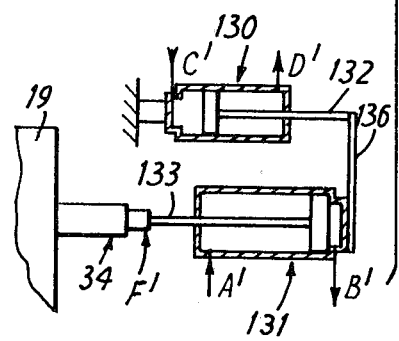
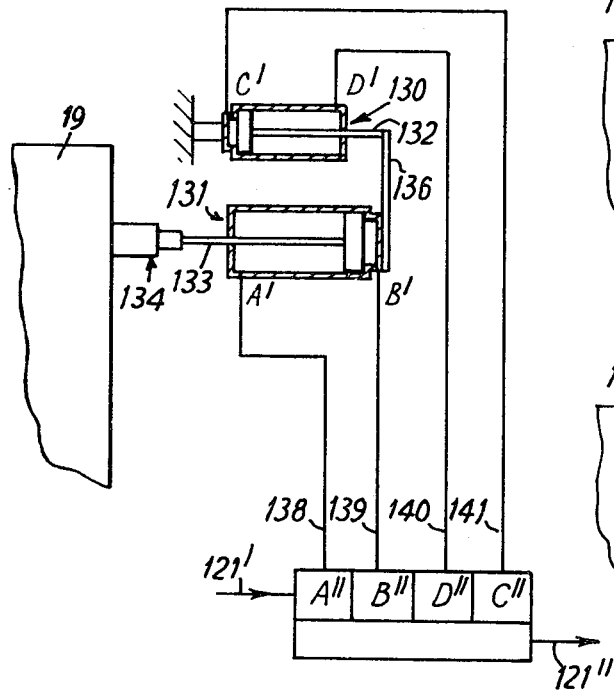
FIG.10
FIG.11

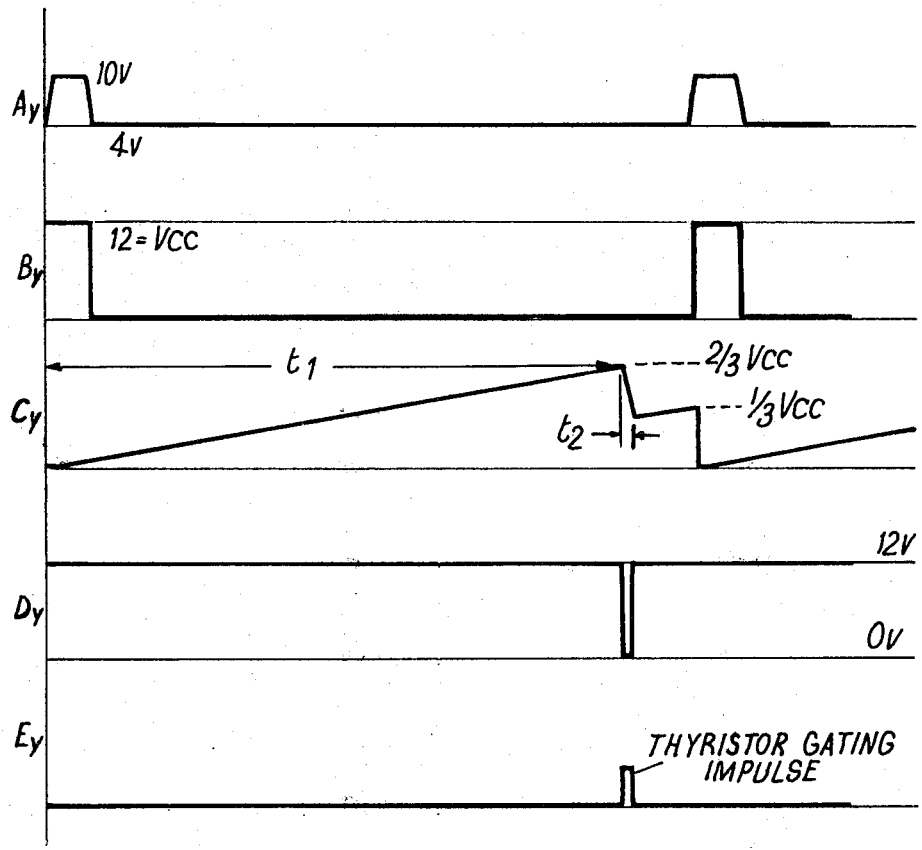

CONTROL APPARATUS FOR DRIVE TRANSMISSIONS

BRIEF SUMMARY OF THE INVENTION

This invention relates to control apparatus for drive transmissions and especially to control apparatus for drive transmissions comprising a forward and reverse drive with one high and one low gear ratio.

Industrial vehicles such as fork-lift trucks are frequently equipped with drive systems in which there is a drive transmission comprising forward and reverse drives with high and low gear ratios. In use, the direction of motion of such a vehicle is changed frequently, especially in the case of a fork-lift truck which is engaged in transporting a large number of crates from one storage position to another. Because of the frequency with which the motion must be reversed, the driver of such a vehicle is tempted to anticipate changes in the direction of drive and to operate the controls of the transmission at times when a damaging amount of strain is put on the transmission by the change selected by the driver. Furthermore, there is the risk that a driver may attempt to start the vehicle when the transmission is in a high gear ratio with the result that the drive system is damaged. One type of drive transmission which is used in industrial vehicles such as fork-lift trucks is a hydraulically-controlled gear system in which engagement of selected gears is effected by hydraulic actuation of selected clutches. In this type of drive transmission, changes of drive direction and starting of the vehicle in a high gear leads to an uneconomically high rate of deterioration of the clutch plates.

Accordingly, one object of the present invention is to provide a control apparatus for a drive transmission which will ensure that the driver of the vehicle cannot make damaging selections of drive direction. Another object of the invention is to provide control apparatus which will ensure that the driver cannot make damaging selections of gear ratio.

According to one aspect of the present invention, there is provided control apparatus for a drive transmission including an input terminal for an electrical signal representative of road speed, and a mechanically operable direction switch adapted to be effective only when the said signal is representative of a road speed which is less than a predetermined road speed, the direction switch being settable in one state for energising actuator means to select forward drive and being settable in another state for energising the said actuator means to select reverse drive.

In a preferred embodiment of the invention, the control apparatus includes first switching means adapted to be so controlled in response to the said electrical signal as to remain in one state thereof during times when the said signal is representative of a road speed which is greater than the said first predetermined road speed, and to be settable in another state thereof by actuation of the manually operable direction switch when the said signal is representative of a road speed which is less than the first predetermined road speed, the first switching means being such that the said other state thereof enables setting of the direction switch to effect energization of the actuator means as selected by the setting of the direction switch.

Where the control apparatus is to control a hydraulically actuated drive transmission in which selection of forward or reverse drive is effected by linear movement, in one direction for forward and the opposite for reverse, of a reciprocable member of the transmission, the apparatus may include a pair of hydraulically operated piston units, adapted to act on the said reciprocable member.

Preferably, the said electrical signal has a frequency representative of a rate of rotation, and the first switching means is adapted to be so controlled in response to the said signal as to remain in one state thereof during each cycle of the said signal when the duration of the cycle is less than a predetermined duration, and to be settable in another state thereof by actuation of the manually operable direction switch when the duration of the said cycle is greater than the said predetermined duration.

The adaption of the first switching means to response to the said signal may be by the provision of first timing circuitry arranged to receive the said signal and to produce a triggering output or not in dependence upon the durations of the cycles of the said signal.

According to a further aspect of the present invention, there is provided control apparatus for a drive transmission, the control apparatus including an input terminal for an electrical signal having a characteristic which is representative of a road speed, first switching means adapted to be so controlled in response to the said signal as to remain in one state thereof during times when the said signal is representative of a road speed which is greater than a first predetermined road speed, and to be settable in another state thereof by actuation of a manually operable direction switch when the said signal is representative of a road speed which is less than the first predetermined road speed, the direction switch being settable in one state for selecting an actuator for forward drive and being settable in another state for selecting an actuator for reverse drive, the first switching means being such that the said other state thereof enables setting of the direction switch to effect energization of the actuator selected by the setting of the direction switch, and second switching means adapted to be so controlled in response to the said signal as to be set into one state thereof in response to a change in the said signal representative of a rise in road speed above a second predetermined road speed and to be set into another state thereof in response to a change in the said signal representative of a fall in road speed below a third predetermined road speed, the second switching means being such as, in operation, to effect energization of a lower gear ratio actuator or a high gear ratio actuator respectively depending upon which one of the said two states of the second switching means prevails.

According to another aspect of the present invention, there is provided control apparatus for a drive transmission, the control apparatus including an input terminal for an electrical signal representative of road speed, and means adapted to be so controlled in response to the said signal so as to be set into one state thereof in response to a change in the said signal representative of a rise in road speed above a predetermined road speed and to be set into another state thereof in response to a change in the said signal representative of a fall in road speed below a further predetermined road speed, the said means being such as, in operation, to effect selection of a first lower gear ratio or a second higher gear ratio respectively depending upon which one of the said two states of the said means prevails.

In a preferred embodiment, the control apparatus is to control a hydraulically actuated drive transmission in which selection of forward or reverse drive is effected by linear movement, in one direction for forward and the opposite for reverse, of one reciprocable member of the transmission, and selection of a low gear ratio and a high gear ratio is effected by linear movement, in one direction for the low and in the opposite direction for the high, of another reciprocable member of the transmission, the said means may include a pair of hydraulically operated piston units, one of these units being adapted to act on the said one reciprocable member and the other unit being adapted to act on the other reciprocable member. Operation of the piston units may be controlled by electrically operated valves.

In other embodiments, where the drive transmission has more than two different selectable gear ratios, the said means may have a corresponding plurality, greater than two, of states, each such state being such that the said means effects selection of the corresponding gear ratio. The said signal in such an embodiment will set the said means into each state thereof on undergoing a respective change representing a rise or fall to a respective road speed.

According to another aspect of the present invention, there is provided control apparatus for a drive transmission, the control apparatus including an input terminal for an electrical signal having a frequency representative of a rate of rotation, first switching means adapted to be so controlled in response to the said signal as to remain in one state thereof during each cycle of the said signal when the duration of the cycle is less than a predetermined duration, and to be settable in another state thereof by actuation of a manually operable direction switch when the duration of the said cycle is greater than the said predetermined duration, the direction switch being settable in one state for selecting an electrical actuator for forward drive and being stable in another state for selecting an electrical actuator for reverse drive, the first switching means being such that the said other state thereof enables setting of the duration switch to effect energization of the electrical actuator selected by the setting of the direction switch, and second switching means adapted to be so controlled in response to the said signal as to be set into one state thereof in response to a cycle of the said signal when the duration of the said cycle falls below a second predetermined duration, and to be set into another state thereof when the duration of the said cycle increases to exceed a third predetermined duration, the second switching means being such as, in operation, to effect energization of a low gear ratio electrical actuator or a high gear ratio electrical actuator respectively depending upon which one of the said two states of the second switching means prevails.

Preferably, the said second and third durations differ from one another in such a way that each change from energization of the low gear actuator to energization of the high gear actuator takes place when the said signal represents a higher rate of rotation than it does when each change from energization of the high gear actuator to energization of the low gear acatuator takes place.

Preferably, the direction switch can furthermore be set in a third state in which means for maintaining a neutral condition of a drive transmission are operative. The neutral maintaining means may include a neutral disabling electrical actuator adapted to be energized whenever the direction switch is in either of its first two states.

The second switching means may be adapted to respond to the said signal by the provision of second timing circuitry arranged to receive the said signal and to produce an output signal of a first magnitude for holding the second switching means in the said one state, or of a second magnitude for holding the second switching means in the other state thereof. The second timing circuitry preferably includes feedback means for controlling a timing constant of the second timing circuitry so as to cause the changes from the first magnitude of the said output signals to the second magnitude thereof to take place in response to a change in duration of the first said signal which is different from the change in the durations of the said cycles at which a change from the second magnitude to the first magnitude takes place.

When the control apparatus is intended to control a hydraulically actuated drive transmission, the said electrical actuators are preferably the respective solenoids of corresponding electrically actuated two-way switching valves for the hydraulic fluid. The control apparatus may then include hydraulically operated mechanical units such as piston units arranged to be controlled by hydraulic fluid in a circuit including the said valves.

Preferred embodiments of the invention will now be described in more detail, solely by way of example, with reference to the accompanying drawings.

BRIEF DESCRIPTION OF THE SEVERAL VIEWS OF THE DRAWINGS

FIG. 10 is a hydraulic circuit diagram, partly in block form, of an alternative hydraulic control equipment included in the drive system of FIG. 1 in accordance with the invention.

FIG. 11 is a set of diagrams illustrating the operation of the equipment of FIG. 10.

FIGS. 13 and 14 are wave form diagrams of signals appearing in operation of the circuit of FIG. 12.

DETAILED DESCRIPTION

Figure 1:
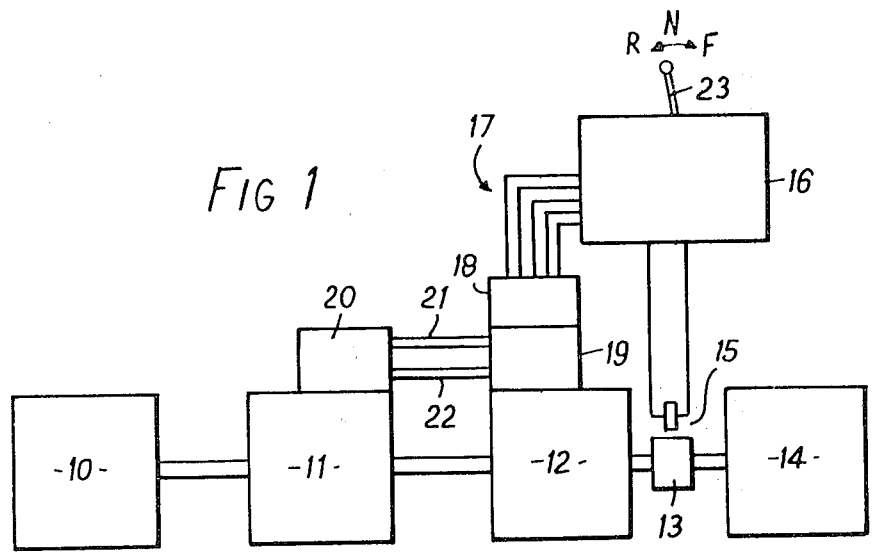
FIG. 1 is a schematic representation of a drive system for a vehicle.

FIG. 1 shows in diagrammatic form a drive system including an internal combustion engine 10 for a vehicle which is intended to be able to move forward or backwards as required by an operator and at a speed controlled by the operator, two gearings of the drive system being provided giving a low gear and a high gear which are selected automatically. The drive system is also arranged to ensure that the engine 10 can be started only when neither the low gear nor the high is engaged.

The engine 10 has an output shaft coupled by a hydraulic torque converter 11 to a hydraulically actuated transmission unit 12. The transmission unit 12 has an output shaft coupled by a universal joint 13 to a differential gear 14 having a pair of output shafts (not shown) coupled respectively to two road wheels (not shown).

An inductive metal-proximity sensor 15 is mounted close to the universal joint 13 in a position in which the sensor 15 produces a stream of electric pulses whenever the joint 13 rotates in either direction, the repetition rate of the pulses being directly proportional to the speed of rotation of the universal joint 13 and therefore directly proportional to the road speed of the vehicle. The pulses generated by the sensor 15 in response to rotation of the joint 13 are supplied to an electronic control unit 16.

The control unit 16 has a number of output leads 17 which connect the unit 16 to an electro-mechanical actuator arrangement 18 which acts upon a valving arrangement 19 controlling the passage of pressurised fluid from a source 20 to the transmission 12. The pressurised fluid, which is oil, passes from the source 20 to the valving arrangement 19 through a supply pipe 21 and returns form the transmission 19 through a pipe 22. The source 20 may also supply and receive the fluid circulated as required through the torque converter 11.

The electronic control unit 16 has a single manually operable switch lever 23 which is pivotally moveable through an arc from one extreme position F in which forward motion of the vehicle is selected to another extreme position R in which reverse motion of the vehicle is selected. The only other controls of the drive system which are under the direct control of the operator are an ignition and starter switch (not shown) and an accelerator pedal (not shown). The lever 23 has a central, neutral position N in which it must be placed to allow starting of the engine 10. The lever 23 may be mounted remote from the remainder of the unit 16 so as to be accessible to the driver, the remainder of the unit being installed in a convenient position on the drive system.

Figure 2:
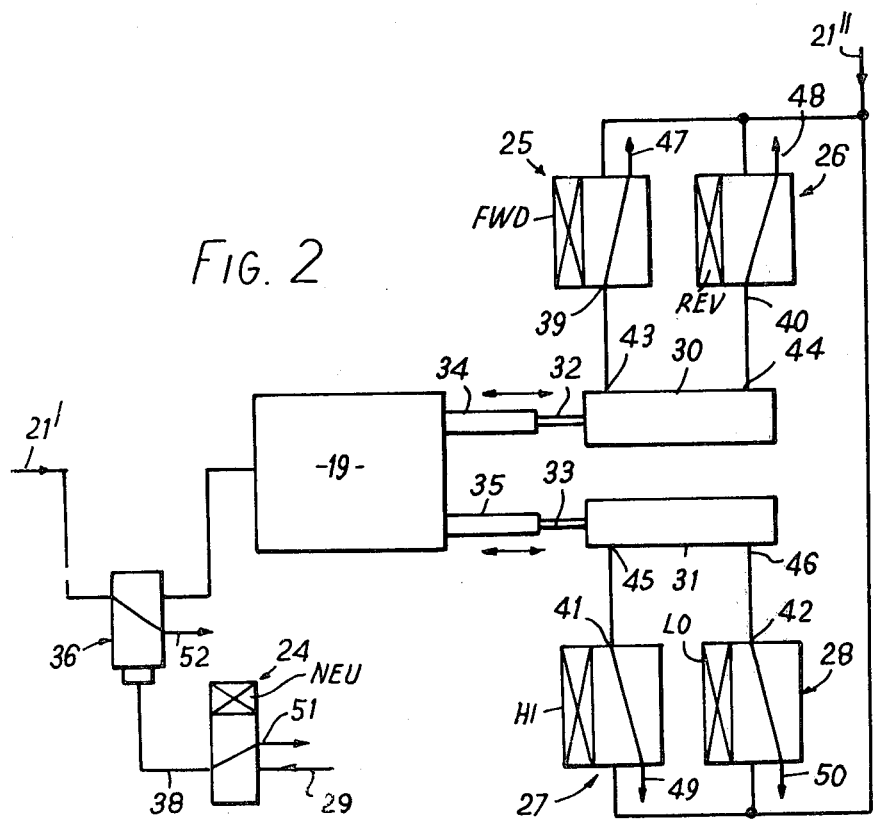
FIG. 2 is a hydraulic circuit diagram, partly in block form, of hydraulic control equipment included in the drive system of FIG. 1 in accordance with the invention.

FIG. 2 shows schematically the electro-mechanical actuator arrangement 18 acting on the valve arrangement 19.

The actuator arrangement 18 includes five electrically operated two-way hydraulic valves 24 to 28, two hydraulic double-acting piston units 30 and 31 having respective actuator rods 32 and 33 joined end-to-end respectively with two control rods 34 and 35 of the valving arrangement 19, and a pilot operated valve 36. Pressurised fluid from the pipe 21 is supplied to a pipe 21' which can be placed in communication with the valving arrangement 19 by the pilot operated valve 36, and pressurized fluid from the pipe 21 is also supplied to the valve 24 through a pipe 29 and to a pipe 21'' which communicates with the valves 25 to 28.

The valves 24 to 28 are spring biased to prevent pressurised fluid supplied to their respective inlet ports reaching outlet ports 38 and 42 which communicate with, respectively, the pilot of the pilot operated valve 36, and inlet-outlet ports 43 to 46 of the double-acting piston units 30 and 31, these inlet-outlet ports 43 to 46 being then in communication, through the valves 25 to 28, with respective venting ports 47 to 50 which can return fluid to the source 20 through the pipe 22. The outlet port 38 of the valve 24 is in communication with a venting port 51 of the valve 24 and thus with the pipe 22.

In the absence of pressurised fluid at the pilot of the pilot valve 36, the pipe 21' is placed in communication with a venting port 52 of the valve 36 which returns the fluid to the pipe 22. The valve 24 has a solenoid NEU which, when energized, causes the inlet port of the valve to be held in communication with the outlet port 38 so that pressurised fluid from the pipe 29 reaches the pilot of the pilot operated valve 36 which, in response thereto, places the pipe 21' in communication with the valving arrangement 19.

The valves 25 to 28 include respective solenoids FWD, REV, HI and LO. Energization of those solenoids causes the respective outlet ports 39 to 42 to be held in communication with the respective inlet ports.

The solenoids FWD and REV are never energised at the same time, either one or the other or neither being energised at any particular time. The solenoids HI and LO also are never energised at the same time, but one or the other is energised at any particular time.

When the solenoid FWD is energized, the supply pipe 21'' is placed in communication with the port 43 of the piston unit 30. The piston (not shown) of the unit 30 is driven to and held at the right hand end, as viewed in FIG. 2, of the unit 30, pressurised fluid filling space to the left of the piston, and fluid in space to the right of the piston being expelled through the port 44, through the valve 26 to its venting port 48 and thus to the pipe 22. Subsequent de-energization of the solenoid RWD results in the state shown in FIG. 2 in which the piston of the unit 30 remains at the right hand end of the unit 30 since both sides of the piston are in contact with fluid which is in communication with a venting port, namely the ports 47 and 48.

When the solenoid REV is energized, pressurised fluid enters the unit 30 through the port 44 from the valve 26 and leaves the unit 30 through the port 43 to return to the pipe 22 by way of the venting port 47 of the valve 25. The piston (not shown) of the unit 30 is driven to the left hand end of the unit 30 so that the actuator rod 32 moves to the left in FIG. 2 and drives the control rod 34 into the valving arrangement 19.

Energization of the solenoids HI and LO results in similar action involving the piston unit 31, the actuator rod 33 and the control rod 35.

Since the control rods 34 and 35 are joined respectively to the actuator rods 32 and 33, the control rods 34 and 35 carry out the same movements as the pistons of units 30 and 31 respectively. The rods 32 and 33 need not be rigidly fixed in alignment with the rods 34 and 35 but may be articulated thereto, or in other embodiments, may act thereon through linkages.

The transmission unit 12, includes four hydraulic clutches (not shown), which are a forward clutch, a reverse clutch, a low speed clutch and a high speed clutch. When the forward clutch is supplied with pressurised fluid, the drive coupled by the unit 12 from the converter 11 to the universal joint 13 is that for forward motion of the vehicle. Similarly, supplying pressurised fluid to the reverse, low speed and high speed clutches respectively results in drive being that for reverse vehicle motion, low speed motion and high speed motion. One or the other of the low and high speed clutches is engaged whenever one or other of the forward and reverse clutches is engaged. A neutral condition of the transmission unit 12 prevails whenever pressurised fluid is not supplied to the selected pair of clutches.

Selection of the pair of clutches to be engaged is effected by the control rods 34 and 35, the out position of the rod 34, shown in FIG. 2, selecting the forward clutch and its in position, which corresponds to the piston of the unit 30 at the left hand end of the unit 30, selecting the reverse clutch. The out position of the rod 35 selects the high speed clutch and the in position of the rod 35 selects the low speed clutch. Hence it will be seen that energization of the FWD, or REV, and the HI or LO solenoids selects the forward or reverse clutch, and the high speed or low speed clutch, respectively. The neutral condition is selected by de-energization of the solenoid NEU since with the solenoid NEU de-energized, the valve 24 is in the condition shown in FIG. 2, the valve 36 couples the pipe 21' to the venting port 52, and no pressurised fluid reaches the valving arrangement 19 which controls, in the manner just described, the supplying of this fluid to the four clutches of the transmission unit 12.

In use, the switch lever 23 is not effective if the vehicle driven by the drive system of FIG. 1 is moving at a speed greater than a first predetermined speed either forward or reverse. This first predetermined speed is chosen to be low enough for a change of direction from forward to reverse or vice versa at any speed below the first predetermined speed to be possible without unacceptable wear or damage to the drive system. In one constructed embodiment, the first predetermined speed is 0.5 miles per hour, so that movement of the lever 23 from F to R or vice versa while the vehicle is moving at more than 0.5 miles per hour has no result, the vehicle continuing its motion undisturbed.

When the time between successive pulses generated by the sensor 15 is representative of a road speed which is less than the first predetermined speed, the switch lever 23 becomes effective to select forward drive by being placed in its F position and to select reverse drive by being placed in its R position. When lever 23 is set in its F position, the electronic control unit 16 energizes the solenoid FWD with the result that the control rod 34 is set in its out position. Similarly, when the lever 23 is set in its R position, the electronic control unit 16 energizes the solenoid REV with the result that the control rod 34 is set in its in position.

The electronic control unit 16 includes means adapted to be set in one state thereof in response to a change in the time between successive pulses generated by the sensor 15 representative of a rise in road speed above a second predetermined speed, for example 5 miles per hour, and to be set in another state thereof in response to a change representative of a fall in road speed below a third predetermined speed, for example 3 miles per hour. In the said one state, these means cause the solenoid HI to be energized, with the result that the control rod 35 is set in its out position, and in the said other state these means cause the solenoid LO to be energized, with the result that the control rod 35 is set in its in position.

Whenever the lever 23 is in the F position or in the R position, the unit 16 energized the solenoid NEU regardless of the speed of the vehicle, thereby ensuring that drive for one direction or the other is transmitted by the transmission unit 12. However, whenever the lever 23 is in the N position, the unit 16 de-energizes the solenoid NEU, with the result that none of the clutches of the transmission unit 12 can be engaged and no drive is transmitted by the unit 12.

Figure 3:
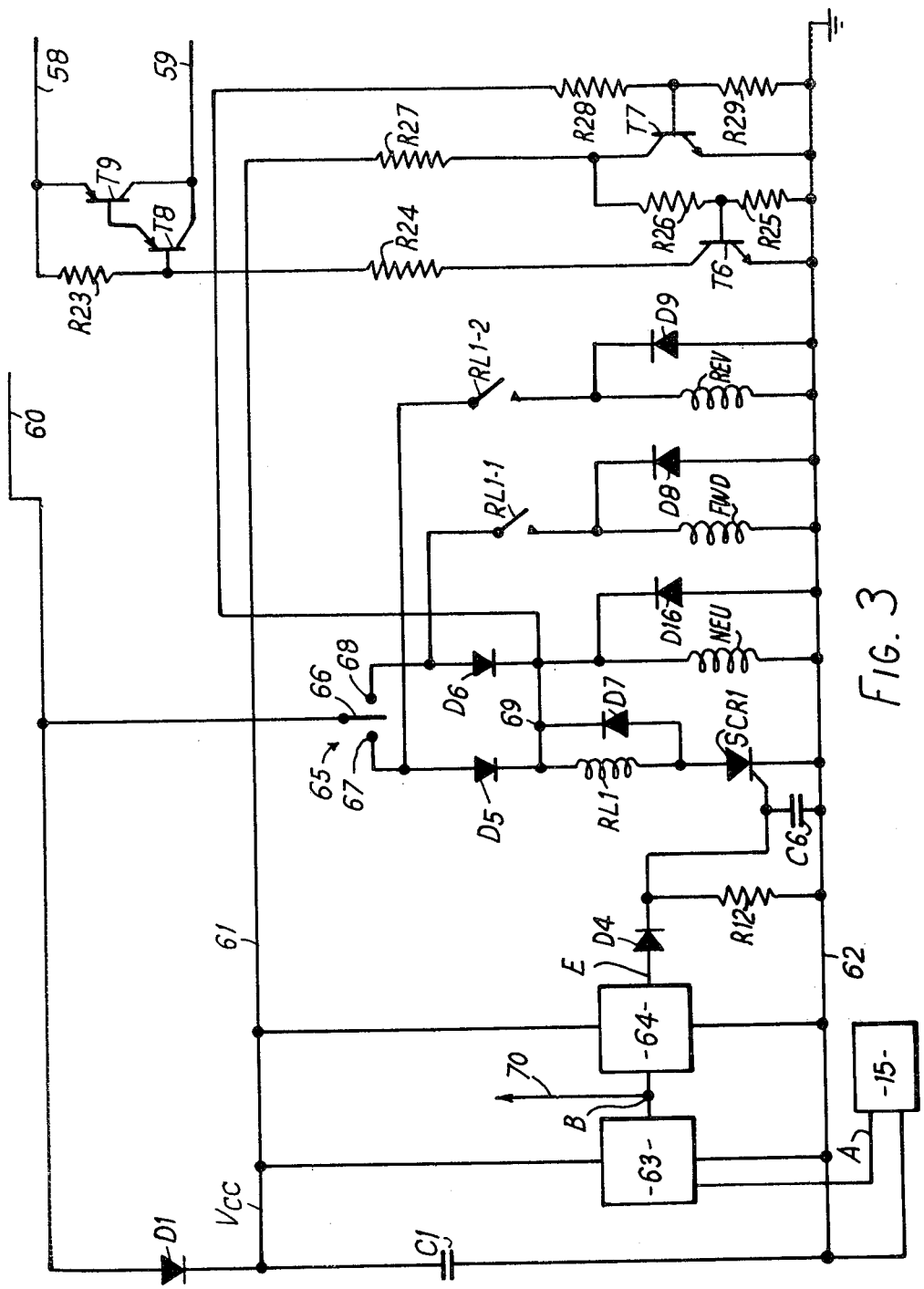
FIG. 3 is an electrical circuit diagram, partly in block form, of part of an electronic control unit included in the system of FIG. 1.
Figure 4:
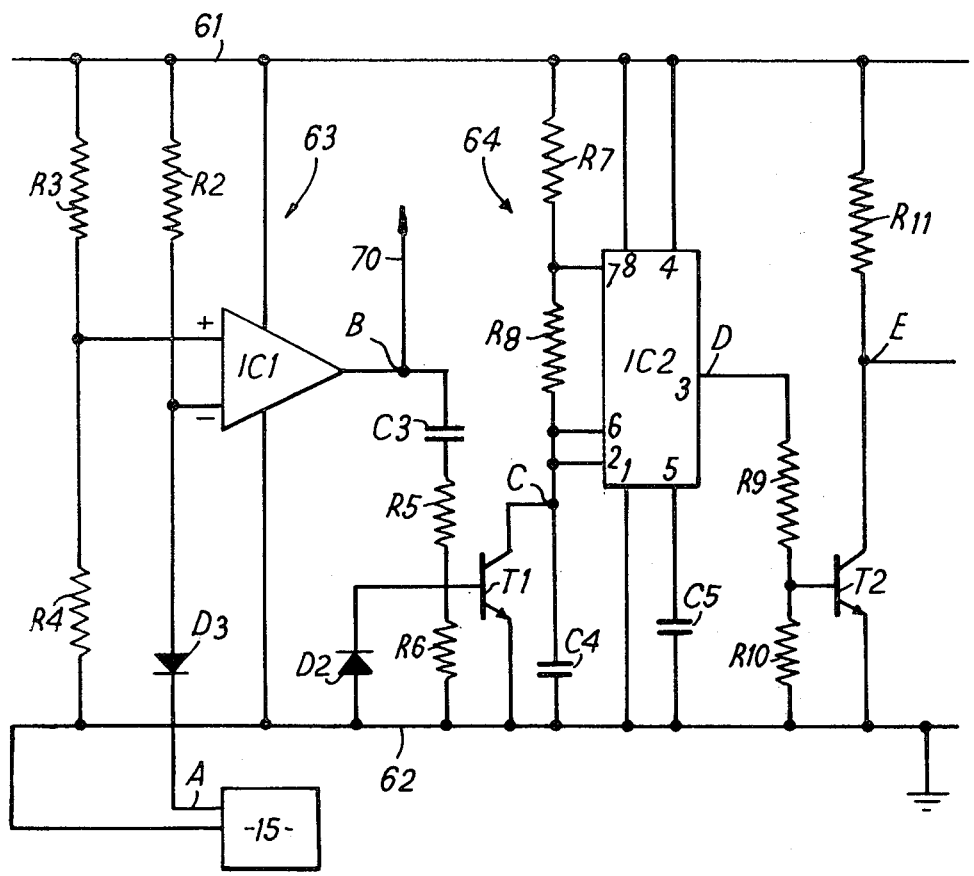
FIG. 4 is an electric circuit diagram, partly in block form, of another part of the electronic unit of FIG. 1.
Figure 5:
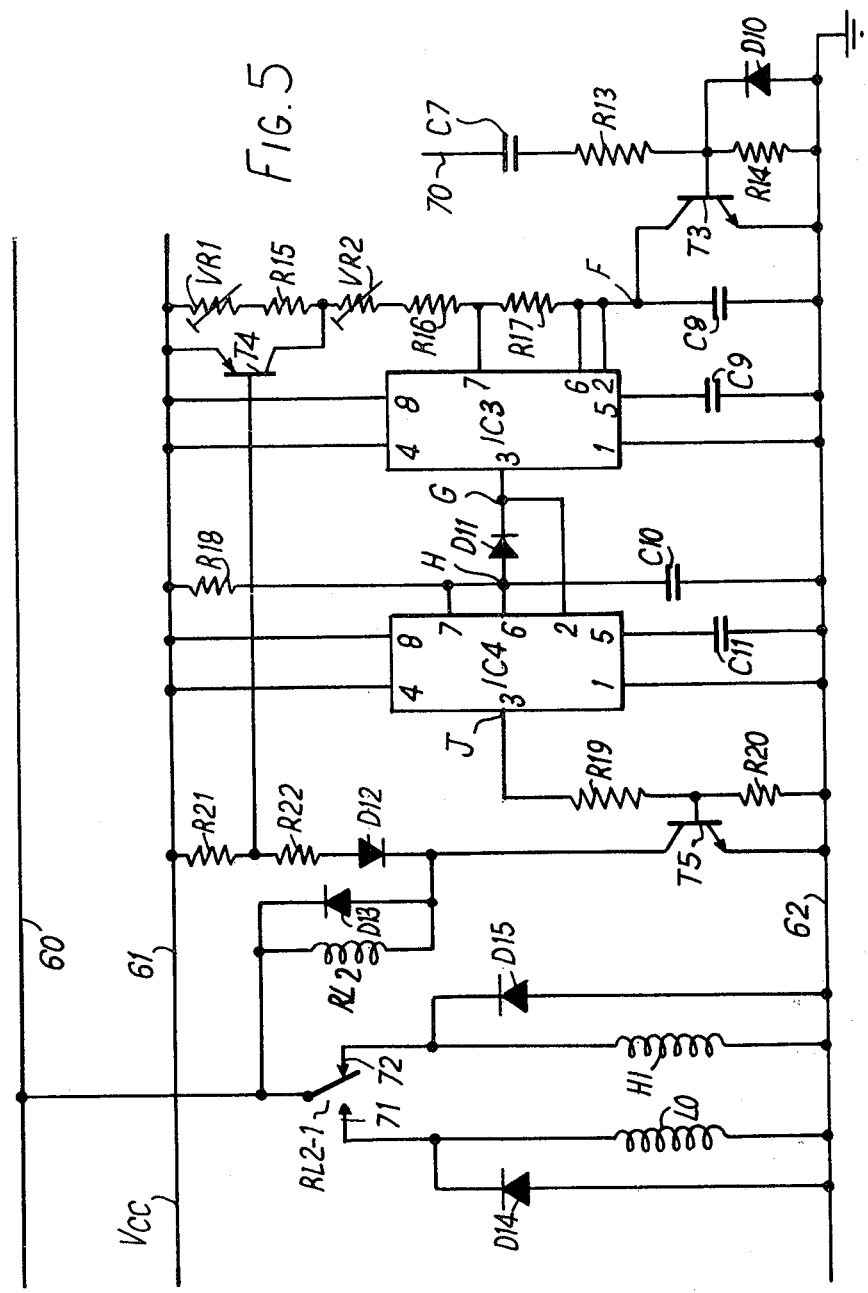
FIG. 5 is an electric circuit diagram, partly in block form, of a further part of the electronic unit of FIG. 1.

FIGS. 3, 4 and 5 show the circuitry of the electronic control unit 16 connected to the solenoids FWD, REV, HI, LO and NEU.

FIG. 3 shows that part of the circuitry which controls the solenoids FWD, REV and NEU.

In FIG. 3, a positive voltage line 60 from the ignition switch (not shown) is coupled through a diode D1 to a positive rail 61 on which a positive voltage $V_{cc}$ is thus established. The diode D1 protects the circuitry from accidental reverse connection of the vehicle battery (not shown), and prevents a capacitor C1 connected between the positive rail 61 and a ground rail 62 from discharging during transients in the voltage on the line 60. The capacitor C1 ensures that the voltage $V_{cc}$ is steady.

The sensor 15 has one output terminal connected to the ground rail 62 and another output terminal A connected to the input terminal of a pulse shaping circuit 63 connected between the rails 61 and 62 and having an output terminal B. A first timing circuit 64 connected between the rails 61 and 62 has its input terminal connected to the terminal B and its output terminal E is coupled by a diode D4 to the gating electrode of a first thyristor SCR1. The first timing circuit 64 produces or does not produce a positive output pulse, depending upon the time between leading edges of pulses appearing at the terminal B. Whenever a positive pulse appears at the terminal E, the thyristor SCR1, if not already conducting, is triggered thereby if a two-way switch 65 has its moveable contact 66 in contact with either of its two fixed contacts 67 and 68. The moveable contact 66 is directly connected mechanically to the switch lever 23, the contact 66 being shown in FIG. 3 in the position it has whenever the lever 23 is in its N position, i.e. the switch 65 is open when the lever 23 is at the N position. It will be seen from FIG. 3 that when the contact 66 is in this position, no current flows through the winding of a relay RL1 or the solenoid NEU or the solenoids FWD and REV, and that consequently the relay RL1 and the solenoids NEU, FWD and REV are in their de-energized conditions.

The relay RL1 has two sets of normally open contacts RL1-1 and RL1-2. When the lever 23 is in its F position, the moveable contact 66 is in contact with the fixed contact 68, and current can flow from the positive voltage line 60 to the contact 68 and thence through the relay contacts RL1-1, if closed, to the solenoid FWD. The relay contacts RL1-1 are only in their closed state if the thyristor SCR1 is conducting, i.e. has been triggered by the timing circuit 64. Similarly, when the lever 23 is in its R position, the moveable contact 66 is in contact with the fixed contact 67, and current can flow from the positive voltage line 60 to the contact 67 and thence through the relay contacts RL1-2, if closed, to the solenoid REV. The relay contact RL1-2 are only in their closed state if the thyristor SCR1 is conducting. Whenever the moveable contact 66 is in contact with either of the fixed contacts 67 and 68, current can flow from the line 60, through the switch 65 to one or the other of two diodes D5 and D6 and thence through the solenoid NEU, so that whichever of the positions F and R the lever 23 is set in, and regardless of whether the thyristor SCR1 is conducting, the solenoid NEU is energised if the ignition switch (not shown) is in its on position. Protective diodes D7, D16, D8 and D9 are connected in parallel with the winding of the relay RL1, and the solenoids NEU, FWD, and REV, respectively. Although both of the sets of relay contacts RL1-1 and RL1-2 close whenever the relay RL1 is energized, and both fixed contacts 67 and 68 of the switch 65 are coupled to the winding of the relay RL1, only that one of the two solenoids FWD and REV which is connected to whichever one of the fixed contacts 67 and 68 has the moveable contact 66 in contact therewith is energized since the diodes D5 and D6 are oppositely poled to one another in the path from the moveable contact 66 to that one of the fixed contacts 67 and 68 which is not in contact therewith. Thus the relay RL1 with its contacts RL1-1 and RL1-2 and the diodes D5 and D6 serve as a first switching means for effecting energization of the solenoid FWD or REV selected by the setting of the lever 23.

The cathodes of the diodes D5 and D6 are connected to a common point 69 which is coupled to the ground rail 62 through two resistors R28 and R29 in series. The positive rail 61 is coupled to the ground rail 62 by three resistors R25, R26 and R27 in series. An NPN switching transistor T7 has its collector connected to the connected ends of the resistors R26 and R27, its emitter connected to the ground rail 62, and its base connected to the connected ends of the resistors R28 and R29, so that the transistor T7 is in its on state when current is flowing to the common point 69 and in its off state when on current is flowing to the common point 69. Consequently, the transistor T7 is on when the lever 23 is in its R or F position, and off when the lever 23 is in the N position. The connected ends of the resistors R25 and R26 are connected to the base of an NPN switching transistor T6 having its emitter connected to the ground rail 62 and its collector coupled to a conductor 58 through two series resistors R23 and R24. The conductor 58 is connected to one contact of the starting switch (not shown) of the vehicle. A conductor 59 connected to the starting solenoid (not shown) of the vehicle is connected to the collectors of two PNP switching transistors T8 and T9. The emitter of the transistor T9 is connected to the conductor 58 and its base is connected to the emitter of the transistor T8. The base of the transistor T8 is connected to the connected ends of the resistors R23 and R24. Consequently, the transistors T8 and T9 are in their on states if the transistor T6 is in its on state, and are in their off states if the transistor T6 is in its off state. The transistor T6 is on if the transistor T7 is off, and vice versa. The starter solenoid is energised only when the conductor 59 is connected to the conductor 58 by the transistors T8 and T9 being in their on states. Consequently, the engine 10 can only be started when the lever 23 is in the N position since only then is the transistor T7 off.

FIG. 4 shows the circuitry of the shaping circuit 63 and the first timing circuit 64. The shaping circuit 63 includes an operational amplifier IC1 having its non-invert input terminal biased to a voltage $\frac{1}{2} V_{cc}$ by connection to the connected ends of two equal resistors R3 and R4 connected in series between the rails 61 and 62. The invert input terminal of the amplifier IC1 is connected to the anode of a diode D3 having its cathode connected to the terminal A of the sensor 15, a resistor R2, equal to the resistor R3, coupling the invert input terminal to the positive rail 61. The output terminal of the amplifier IC1 is the output terminal B of the circuit 63. The terminal B is coupled to the ground rail 62 by a series combination of a capacitor C3 and two resistors R5 and R6, a diode D2 being connected in parallel with the resistor R6 as shown and having its cathode connected to the base of an NPN switching transistor T1 having its emitter connected to the ground rail 62 and its collector connected to a common point C at which a resistor R8 and a capacitor C4 are connected together, the resistor R8 and a resistor R7 in series therewith coupling the point C to the positive rail 61, and the capacitor C4 coupling the point C to the ground rail 62. An integrated circuit IC2 having pins 1 to 8 has its pins 2 and 6 connected to the point C, its pin 7 connected to the connected ends of the resistors R7 and R8, its pin 1 connected to the ground rail 62, its pins 4 and 8 connected to the positive rail 61, its pin 5 coupled by a capacitor C5 to the ground rail 62, and its pin 3 connected to a terminal D which is coupled to the ground rail 62 by two resistors R9 and R10 in series. The integrated circuit IC2 is a Signetics NE/SE555 timer and in the circuit 64 acts as an astable multivibrator whose characteristic operating time is determined by the values of the resistors R7 and R8 and the capacitor C4.

An NPN switching transistor T2 has its base connected to the connected ends of the resistors R9 and R10, its emitter connected to the ground rail 62, and its collector coupled by a resistor R11 to the positive rail 61. The output terminal E of the timing circuit 64 is connected to the collector of the transistor T2.

Figure 6:
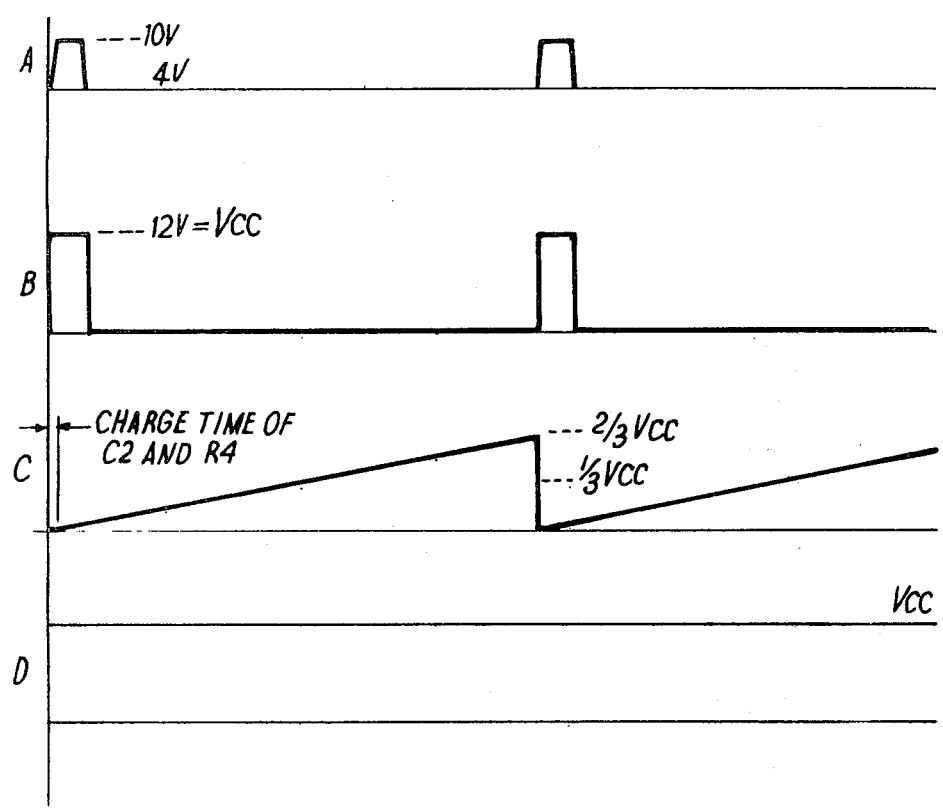
FIGS. 6 and 7 are wave form diagrams of signals appearing in operation in the circuits of FIGS. 3 and 4.
Figure 7:
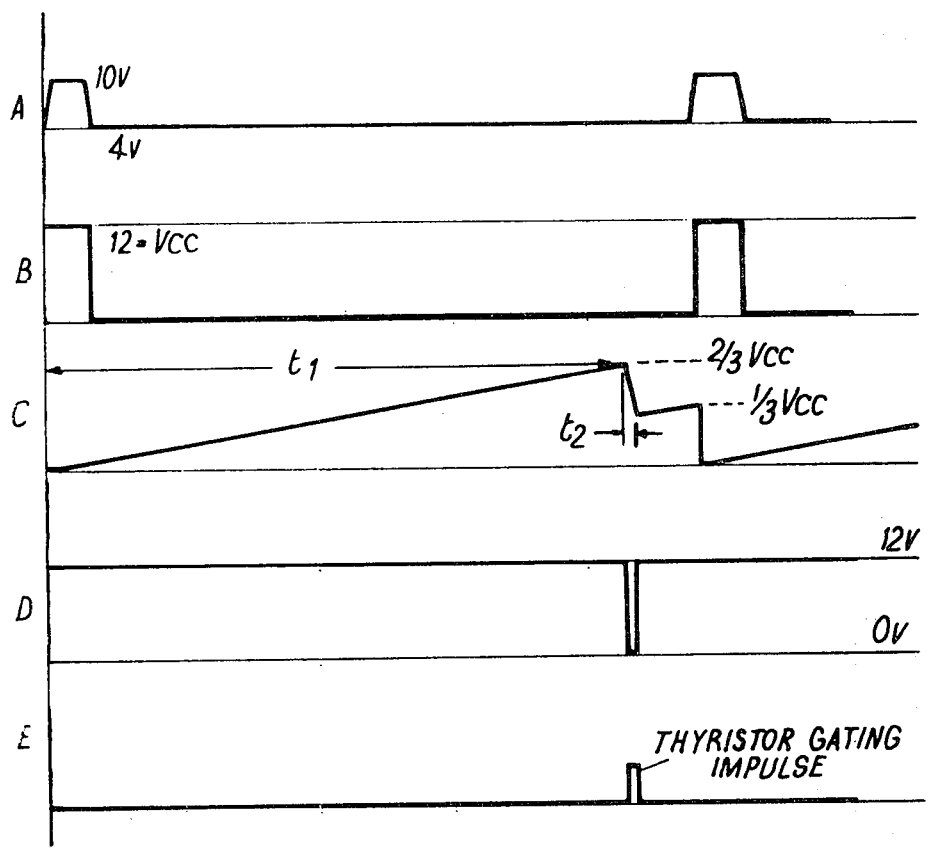

The integrated circuit IC2 operates such that the pin 3 is its output terminal. FIGS. 6 and 7 show the voltage waveforms which appear at the terminals and points A, B, C, D, and E in FIG. 4 under different conditions.

In FIG. 6, the waveform at A is that generated when the vehicle is moving at a speed greater than the first predetermined speed, e.g. 0.5 miles per hour. The amplifier IC1 amplifies the pulses in the waveform at A to provide square pulses in the waveform at B. Assuming that the capacitor C3 is in a discharged condition immediately before a pulse at B, the pulse causes the voltage $V_{cc}$ to be applied across the resistors R5 and R6 with the result that the transistor T1 is biased into its on state and the capacitor C4 is rapidly discharged through the transistor T1 and remains with zero volts across it until the capacitor C3 charges sufficiently for the voltage at the base of the transistor T1 to bias the transistor T1 off. The voltage at C then begins to rise as the capacitor C4 charges through the resistors R7 and R8. The values of the resistors R7 and R8 and the capacitor C4 are chosen to be such that the voltage at C fails to reach $\frac{2}{3} V_{cc}$ before the leading edge of the succeeding pulse at B occurs if the speed of the vehicle is 0.5 miles per hour or greater. The voltage at the pin 3 and hence at D remains high at $V_{cc}$ if the voltage at C and hence at pin 2 remains below $\frac{2}{3} V_{cc}$.

The diode D2 protects the base-emitter junction of the transistor T1 against damaging levels of reverse bias at the occurrence of the trailing edges of the pulses at B.

The transistor T2 acts as an inverter so that the high voltage $V_{cc}$ at D results in zero volts at E.

FIG. 7 shows the result of a speed of less than 0.5 miles per hour. The voltage at C has sufficient time $t_1$ to reach $\frac{2}{3} V_{cc}$ with the result that the integrated circuit IC2 begins to operate as an astable multivibrator discharging the capacitor C4 internally to a voltage $\frac{1}{3} V_{cc}$ within a time $t_2$. The voltage at pin 2 and hence at C would rise to the voltage $\frac{2}{3} V_{cc}$ and fall again to $\frac{1}{3} V_{cc}$ repeatedly except for the occurrence of a succeeding pulse at B which discharges the capacitor C4 to zero. During the astable phase of discharge of the capacitor C4 from $\frac{2}{3} V_{cc}$ to $\frac{1}{3} V_{cc}$, the voltage at pin 3 and hence at D is at zero volts. Consequently, a thyristor gating impulse is produced at E during $t_2$ as shown in FIG. 7. If the moveable switch contact 66 is at this time in contact with either of the fixed contacts 67 and 68, the thyristor SCR1 latches on and conducts until the switch 65 is opened by movement of the lever 23.

If the vehicle is stationary, no pulses occur at B, the integrated circuit IC2 operates as an astable multivibrator, and the thyristor SCR1 is supplied with gating impulses, so that the solenoid FWD or REV can be energised immediately.

FIG. 5 shows another part of the control unit 16 which includes a second switching means in the form of an NPN switching transistor T5 and a relay RL2 which has one set of contacts RL2-1 which comprise a moveable contact connected to the positive voltage line 60, and two fixed contacts 71 and 72 connected respectively to the solenoids LO and HI so that the solenoid LO is connected between the fixed contact 71 and the ground rail 62, and the solenoid HI is connected between the fixed contact 72 and the ground rail 62. Protective diodes D14 and D15 are connected in parallel with the solenoids LO and HI respectively, and a protective diode D13 is connected in parallel with the winding of the relay RL2 which has one end thereof connected to the positive line 60 and the other end thereof connected to the collector of the transistor T5, the emitter of which is connected to the ground rail 62.

The relay RL2 is energised when the transistor T5 is on, and is in its de-energised state when the transistor T5 is off. The moveable contact of the set RL2-1 rests in contact with the fixed contact 72 whenever the relay RL2 is in its de-energised state, and is held in contact with the fixed contact 71 whenever the relay RL2 is in its energised state.

A conductor 70 connects the point B of FIGS. 3 and 4 to a series combination of a capacitor C7 and two resistors R13 and R14, the resistor R14 being connected to the ground rail 62 and having a diode D10 connected in parallel therewith, the anode of the diode D10 being connected to the ground rail 62 and its cathode being connected to an NPN switching transistor T3. The emitter of the transistor T3 is connected to the ground rail 62, and the collector is connected to a point F which is coupled to the ground rail 62 by a capacitor C8 and to the positive rail 61 by three fixed resistors R15, R16 and R17 and two variable resistors VR1 and VR2 connected in series as shown. The variable resistor VR1 and the fixed resistor 15 can be short circuited by a PNP switching transistor T4 the base of which is connected to respective connected ends of two resistors R21 and R22 connected in series between the positive rail 61 and the anode of a diode D12 which couples the resistor R22 to the collector of the transistor T5.

The collector of the transistor T3 is also connected to the pins 2 and 6 of another integrated circuit IC3 which is a Signetus Timer NE/SE 555 connected between the rails 61 and 62 as shown to operate as an astable multivibrator.

The items C7, R13, R14, D10, T3, C8, C9, IC3, and the effective resistance of the resistors R15, R16, R17, VR1 and VR2 operate in the same manner as the items C3, R5, R6, D2, T1, C4, IC2, and the series resistance of the resistors R7 and R8, respectively, but the time constant involving the capacitor C8 differs from that involving the capacitor C4. Furthermore, it will be seen that two time constants are associated with the capacitor C8, one serving when the transistor T4 is off, and another serving when the transistor T4 is on, so that these time constants are selected automatically in accordance with the state of the relay RL2, the transistor T4 being on when the transistor T5 is on, and the transistor T4 being off when the transistor T5 is off.

The output pin 3 of the integrated circuit IC3 is connected to a point G which is connected to the input pin 2 of a further integrated circuit IC4 which is also a Signetics Timer NE/SE 555 but is connected between the rails 61 and 62 to operate as a monostable circuit, its pins 6 and 7 being connected together at a point H which is coupled by a resistor R18 to the positive rail 61 and by a capacitor C10 to the ground rail 62. Direct connections to the rail are provided for IC4 as for IC2 and IC3 at the pins 1, 4 and 8, and the pin 5 is again coupled to the ground rail 62 by a capacitor C11. The pins 6 and 7 are also connected to the anode of a diode D11 which couples these pins to the point G.

The output pin 3 of the integrated circuit IC4 is connected at a point J to two resistors R19 and R20 in series which couple the point J to the ground rail 62. The connected ends of the resistors R19 and R20 are connected to the base of the transistor T5 so that the waveform appearing in operation at J controls the transistor T5.

Figure 8:
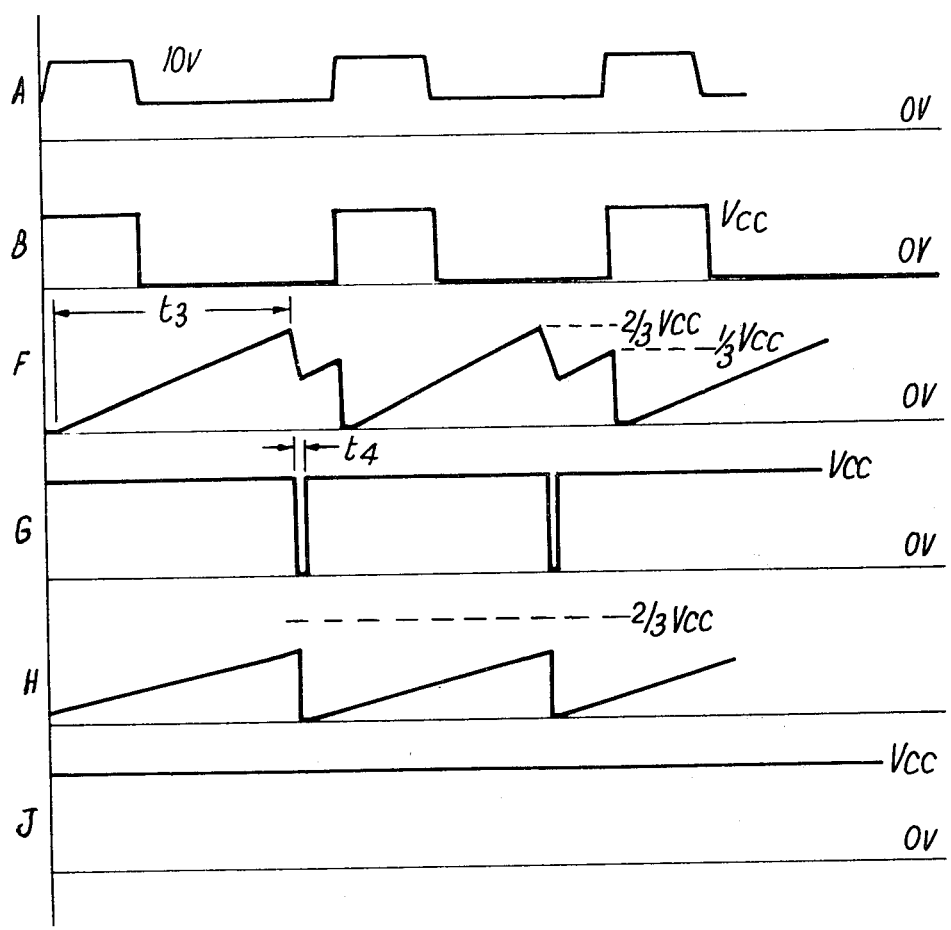
FIGS. 8 and 9 are wave form diagrams of signals appearing in operation in the circuits of FIGS. 4 and 5.
Figure 9:
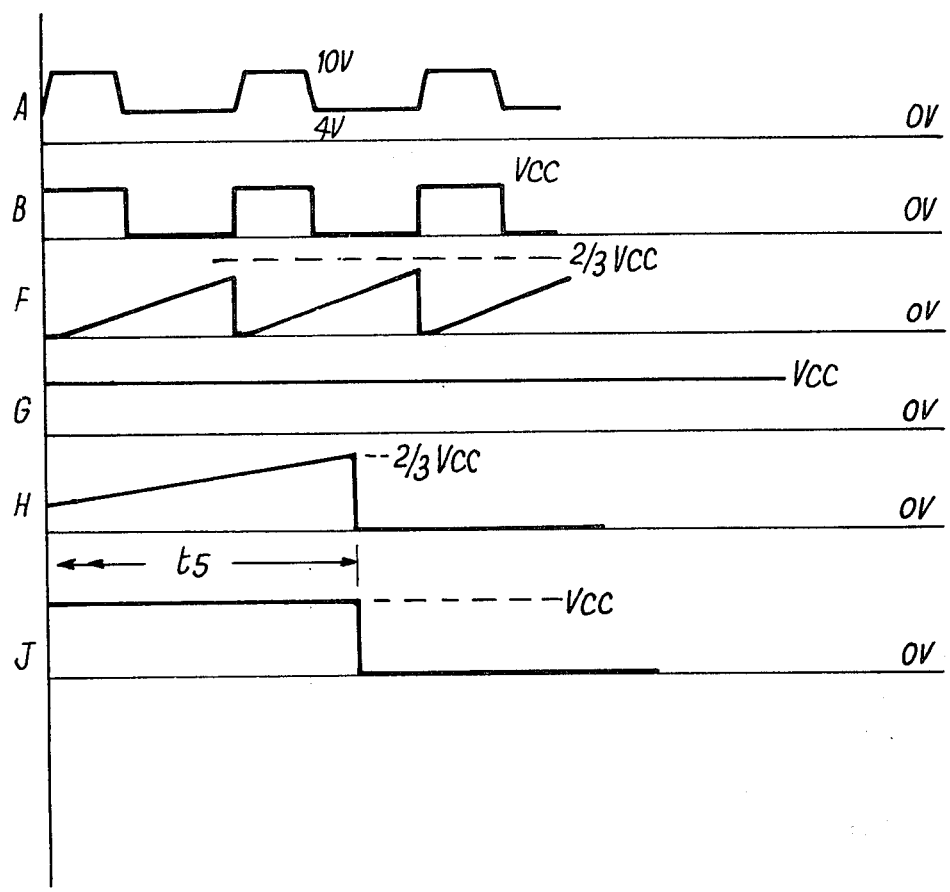

Voltage waveforms which can appear at the points A, B, F, G, H and J are shown in FIGS. 8 and 9.

FIG. 8 illustrates operation when the vehicle is moving at less than a second predetermined speed, e.g. 5 miles per hour. The time between successive leading edges of the pulses at B is then sufficiently long for the voltage at F to reach $\frac{2}{3} V_{cc}$ and for the integrated circuit IC3 to consequently operate for a short time at an astable multivibrator so that the voltage at F tends to oscillate between $\frac{2}{3} V_{cc}$ and $\frac{1}{3} V_{cc}$ and the voltage at G is switched to zero for a short time $t_4$. The time $t_3$ taken for the voltage at F to reach $\frac{2}{3} V_{cc}$ from zero has either one or two values depending upon whether the transistor T4 is on or off. For FIG. 8 it is assumed that the relay RL2 is in its energised state, the vehicle being in its low gear, so that the transistor T4 is on.

The time constant of the monostable circuit IC4 is determined by the time taken by the capacitor C10 to charge from zero to $\frac{2}{3} V_{cc}$ volts. The capacitor C10 is, however, discharged to zero through the diode D11 each time the voltage at G is at zero. It is arranged that the time $t_5$ for the capacitor C10 to charge from zero to $\frac{2}{3} V_{cc}$ is equal to the time between leading edges of successive pulses at B when the vehicle is moving at about 0.7 miles per hour. The repetition rate of the integrated circuit IC3 in its astable mode of operation is much shorter than this time, so that however slowly the vehicle travels under 5 miles per hour, the voltage at G switches between $V_{cc}$ and zero sufficiently rapidly to prevent the voltage at H reaching $\frac{2}{3} V_{cc}$. Consequently, the voltage at J remains high at $V_{cc}$.

If the speed of the vehicle is now increased until it exceeds 5 miles per hour, the events illustrated in FIG. 9 take place. The time between the leading edges of successive pulses at B is less than $t_3$, so that the voltage at F no longer reaches $\frac{2}{3} V_{cc}$ before dropping back to zero as a result of the switching on of the transistor T3. Consequently, the voltage at G remains at $V_{cc}$ and the voltage at H ramps up to $\frac{2}{3} V_{cc}$, whereupon the capacitor C10 is discharged to zero by an internal circuit of the integrated circuit IC4 and is held discharged until the voltage at G drops to zero again. Thus as the speed of the vehicle increases through 5 miles per hour, the voltage at J, with a slight delay, drops from $V_{cc}$ to zero, the transistor T5 is switched off, the relay RL2 de-energises, and the solenoid HI is energised, thereby automatically bringing the high gear into operation provided the lever 23 is being held in its F or R position.

When the vehicle is in its high gear and is being decelerated, but is above a third predetermined speed, e.g. 2 miles per hour, the voltage at J and H is zero, the voltage at G is $V_{cc}$, and the voltage at F is below $\frac{2}{3} V_{cc}$. The charging time for the capacitor C8 is determined by the resistors VR1, R15, VR2, R16 and R17, the transistor T4 being off. It will be realized that this charging time determines the value of the third predetermined speed, in the same way that the second predetermined speed is determined by the charging time for C8 when T4 is on. When the speed of the vehicle has fallen on the third predetermined speed, the voltage at F can reach $\frac{2}{3} V_{cc}$, and the voltage at G switches to zero, thereby causing the voltages at H and J to switch to $V_{cc}$, so that the transistors T5 and T4 switch on, the relay RL2 is energised, and the transmission unit 12 changes from the high gear to the lower gear.

In a constructed embodiment, the values of items used in the timing parts of the circuitry are as follows:
C7=C3=0.1 microfarads
R13=R5=10 kilohms
R14=R6=5.6 kilohms
R7=470 kilohms
R8=about 1 kilohm
C4=1 microfarad
VR1=200 kilohms maximum
R15=100 kilohms
VR2=200 kilohms maximum
R16=10 kilohms
R17=1 kilohm
C8=0.47 microfarads
R18=270 kilohms
C10=1 microfarad The sensor 15 in the constructed embodiment produces pulses at A in response to rotation of the universal joint 13 which in effect has two diametrically opposite regions of larger radius, relative to the axis of rotation, separated by two diametrically opposite regions of smaller radius. Pulses may also be produced in response to the passage of bolt heads in front of the sensor 15 if the sensor 15 is mounted close to a rotating flange coupling in the coupling between the output shaft of the transmission unit 12 and the differential gear 14.

The sensor 15 may be a Bi 5-G-18-YO as manufactured by Turk GmbH of West Germany and available from Hird-Brown Limited of Bolton, Lancashire, England. The solenoid valves 24 to 28 and a block of four electrically operated two-way hydraulic valves for use as a block of valves A", B", C", D" as described hereinafter with reference to FIG. 10 are available from Enots Limited of Litchfield, Staffordshire, England. The drive transmission of FIG. 1, apart from the novel hydraulic and electrical equipment of the present invention, may be a T22 Borg-Warner Transmission as installed in a V22 or V100 Caterpillar fort-lift truck.

FIG. 10 shows schematically in detail part of an alternative electro-mechanical actuator arrangement 18 acting on the valving arrangement 19 in accordance with the invention.

The alternative actuator arrangement 18 includes a block of four electrically operated two-way hydraulic valves A", B", C" and D", and two hydraulic double-acting piston units 130 and 131 having respective actuator rods 132 and 133 and arranged to control a forward-neutral-reverse control of the valving arrangement 19. Pressurised fluid is supplied at an inlet 121' to the valves A", B", C" and D", and can be exhausted therefrom through an outlet 121". Pressurised fluid from the pipe 21 is supplied to the inlet 121'.

The valves A", B", C" and D" are spring biased to prevent pressurised fluid supplied to their respective inlet ports reaching outlet ports 138 to 141 which communicate with, respectively, inlet-outlet ports A', B', D' and C' of the double-acting piston units 130 and 131, these inlet-outlet ports A', B', D' and C' being then in communication, through the valves A", B", D" and C" respectively, with respective venting ports which can return fluid to the source 20 through the pipe 22 via the outlet 121".

The valves A", B", C" and D" have respective solenoids A''', B''', C''' and D''' (FIG. 12) which, when energised, cause the respective inlet ports of the valves to be held in communication with the respective outlet ports 138, 139, 141 and 140.

The solenoids B''' and C''' are never energised at the same time, either one or the other or neither being energised at any particular time.

When the solenoids B''' and D''' are both energised, the supply pipe 121' is placed in communication with the ports B' and D' of the piston units 130 and 131. The piston (now shown) of the unit 130 remains at or is driven to and held at the left-hand end, as viewed in FIGS. 10 and 11, of the unit 130, pressurised fluid filling space to the right of the piston, and any fluid in space to the left of the piston being expelled through the port C', through the valve C" to its venting port and thus to the pipe 22. The piston of the unit 131 is similarly driven leftwards and a state shown in the middle diagram of FIG. 11 results since the outer end of the rod 132 of the unit 130 is rigidly connected by a strap 136 to the cylinder of the unit 131 as shown, the cylinder of the unit 130 being fixed and the cylinder of the unit 131 being moveable.

When the solenoids A''' and C''' are both energised, pressurised fluid enters the unit 130 through the port C' from the valve C" and leaves the unit 130 through the port D' to return to the pipe 22 by way of the venting port of the valve D". The piston of the unit 130 is driven towards the right-hand end of the unit 130 so that the cylinder of the unit 131 moves to the right as shown in the bottom diagram of FIG. 11. Pressurised fluid enters the unit 131 through the port A' and leaves through the port B'. The piston of the unit 131 is driven rightwards as shown.

The control rod 134 is joined to the outer end of the actuator rod 132 of the unit 131 so that the control rod 134 carries out the same movements as the piston of unit 130.

Selection of the pair of clutches to be engaged is effected by the control rods 34 and another (not shown), the out position R' of the rod 34, shown in the middle diagram of FIG. 2, selecting the reverse clutch and its in position F' shown in the bottom diagram of FIG. 2, selecting the forward clutch. The neutral condition is selected by energisation of both of the solenoids A''' and D''' since when the valves A" and D" supply pressurised fluid to the units 131 and 130 respectively so that the piston of the unit 131 is at the right-hand end of its cylinder and the piston of the unit 130 is at the left-hand end of its cylinder, as shown in FIG. 10 and in the top diagram of FIG. 11 in which the control rod 134 is a mid-position N' to disengage the forward and reverse clutches.

In use, the switch lever 23 is not effective if the vehicle driven by the drive system of FIG. 1 is moving at a speed greater than a first predetermined speed either forward or reverse. This first predetermined speed is chosen to be low enough for a change of direction from forward to reverse or vice versa at any speed below the first predetermined speed to be possible without unacceptable wear or damage to the drive system. In one constructed embodiment the first predetermined speed is 0.5 miles per hour, so that movement of the lever 23 from F to R or vice versa while the vehicle is moving at more than 0.5 miles per hour has no result, the vehicle continuing its motion undisturbed.

When the time between successive pulses generated by the sensor 15 is representative of a road speed which is less than the first predetermined speed, the switch lever 23 becomes effective to select forward drive by being placed in its F position and to select reverse drive by being placed in its R position. When lever 23 is set in its R position, the electronic control unit 16 energises the solenoids B''' and D''' with the result that the control rod 134 is set in its in position R'. Similarly, when the lever 23 is set in its F position, the electronic control unit 16 energises the solenoids A''' and C''' with the result that the control rod 134 is set in its out position F'.

If the lever 23 remains for some time in the N position, the unit 16 energises the solenoids A''' and D''' regardless of the speed of the vehicle, with the result that none of the clutches of the transmission unit 12 can be engaged and no drive is transmitted by the unit 12. However, if the lever 22 is taken from, for example, the F position to the R position quickly, then the neutral condition is not engaged and the system goes straight from forward to reverse and does not dwell in neutral. This change can only occur if the vehicle speed is below the first predetermined speed of, for example, 0.5 miles per hour. Should the vehicle speed be higher than this predetermined speed, then the forward drive will be maintained until the vehicle is brought to rest.

Figure 12:
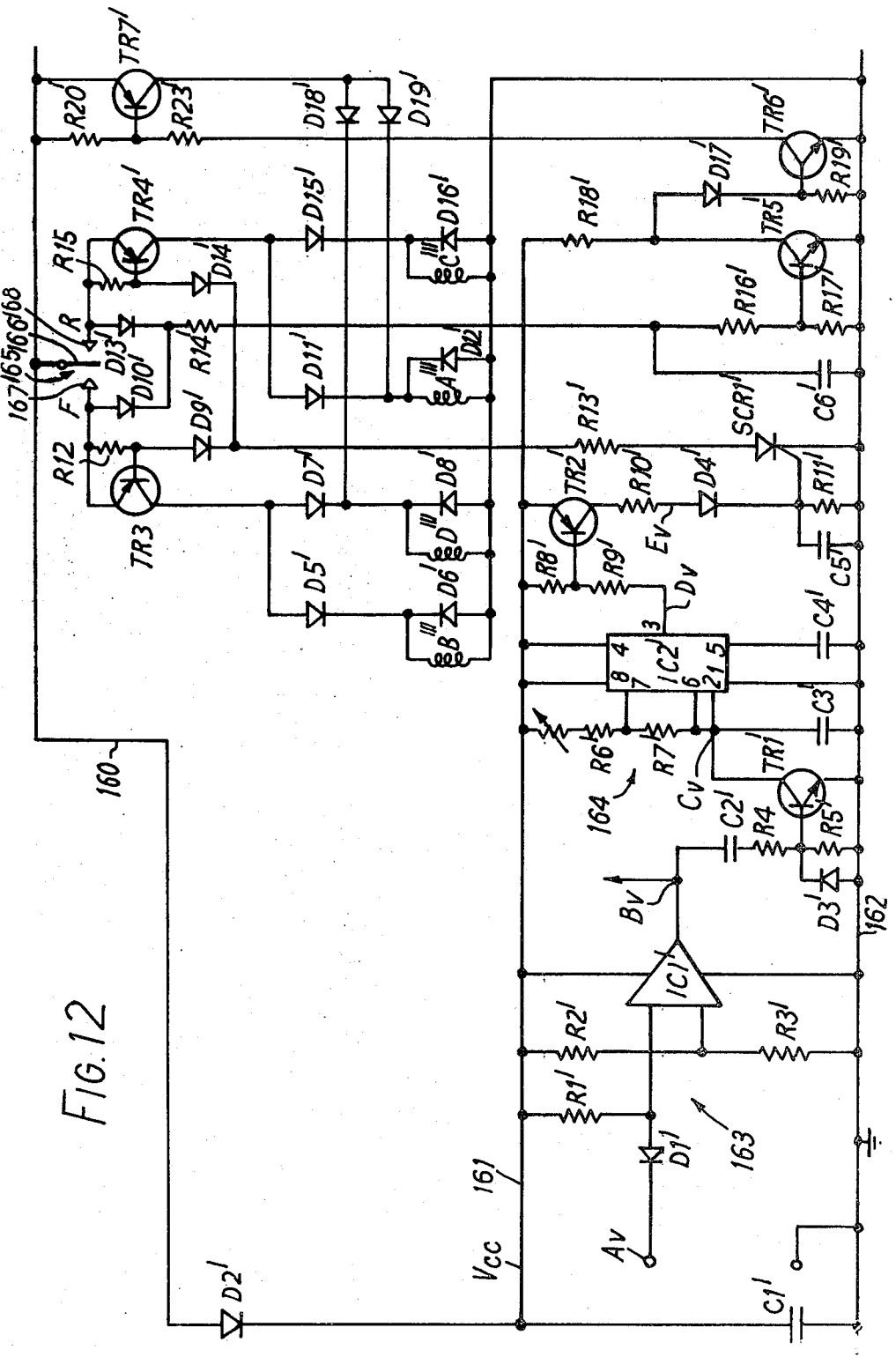
FIG. 12 is an electrical circuit diagram, partly in block form, of part of an alternative electronic control unit included in the drive system of FIG. 1 with the hydraulic equipment of FIG. 10.

FIG. 12 shows that part of the circuitry of the electronic control unit 16 which includes and controls the solenoids A''', B''', C''' and D'''.

In FIG. 12 a positive voltage line 160 from the ignition switch (not shown) is coupled through a diode D2' to a positive rail 161 on which a positive voltage $V_{cc}$ is thus established. The diode D2' protects the circuitry from accidental reverse connection of the vehicle battery (not shown), and prevents a capacitor C1' connected between the positive rail 161 and a ground rail 162 from discharging during transients in the voltage on the line 160. The capacitor C1' ensures that the voltage $V_{cc}$ is steady.

The sensor 15 (not shown in FIG. 12) has one output terminal connected to the ground rail 162 and another output terminal Av connected to the input terminal of a pulse shaping circuit 163 connected between the rails 161 and 162 and having an output terminal Bv. A timing circuit 164 connected between the rails 161 and 162 has its input terminal connected to the terminal Bv and its output terminal Ev is coupled by a diode D4' to the gating electrode of a thyristor SCR1'. The timing circuit 164 produces or does not produce a positive output pulse, depending upon the time between leading edges of pulses appearing at the terminal Bv. Whenever a positive pulse appears at the terminal Ev, the thyristor SCR1', if not already conducting, is triggered thereby if a two-way switch 165 has its moveable contact 166 in contact with either of its two fixed contacts 167 and 168. The moveable contact 166 is directly connected mechanically to the switch lever 23, the contact 166 being shown in FIG. 12 in the position it has whenever the lever 23 is in its N position, i.e. the switch 165 is open when the lever 23 is at the N position. It will be seen from FIG. 12 that when the contact 166 is in this position, no current flows through the solenoids B''' and C'''. However, if a transistor TR7' is biased to conduct, current flows through the solenoids A''' and D''' via diodes D18' and D19', so that the neutral setting of FIG. 10 and the top diagram of FIG. 11 are obtained. The transistor TR7' is biased to conduct when a transistor TR6', coupled thereto by resistors R20' and R23' as shown, is conducting. A transistor TR5' controls the transistor TR6', the transistor TR6' being "on" when TR5' is "off" and vice versa. TR5' is "off" when the movable contact 166 is in the neutral position shown in FIG. 12 since when the base of the transistor TR5' is grounded through a base bias resistor R17'. When the movable contact 166 is in contact with either of the fixed contacts 167 and 168, the transistor TR5' is forward biased, and TR6' and TR7' are turned "off". Consequently, if a transistor TR3' is conducting, the solenoids B''' and D''' only are energised, and if a transistor TR4' is conducting, the solenoids A''' and C''' only are energised. Whenever the movable contact 166 is in contact with either of the fixed contacts 167 and 168, current can flow from the line 160, through the switch 165 to one of the other of two diodes D10' and D13' and thence through a resistor R16' and the resistor R17', so that whichever of the positions F and R the lever 23 is set in, the transistor TR5' conducts if the ignition switch (not shown) is in its on condition. Protective diodes D6', D8', D12' and D16' are connected in parallel with the solenoids B''', D''', A''' and C''', respectively. Whenever the thyristor SCR1' conducts, a selected one of the two transistors TR3' and TR4', namely that one which is connected to whichever one of the fixed contacts 167 and 168 has the movable contact 166 in contact therewith, is able to conduct since diodes D9' and D14' are oppositely poled to one another in a path from the movable contact 166 to that one of the fixed contacts 167 and 168 which is not in contact therewith, and the diode of the thyristor SCR1' is coupled by a resistor R13' to the cathodes of the diodes D9' and D14'. Thus, the thyristor SCR1' and the diodes D9' and D14' serve as a first switching means for effecting energisation of one of the solenoid pairs B''' and D''' or A''' and C''' as selected by the setting of the lever 23.

Circuitry may be provided, coupled to the cathodes of the diodes D9' and D14' to ensure that a starter solenoid (not shown) is energised and consequently, the engine 10 started only when the lever 23 is in the N position as described hereinbefore.

The shaping circuit 163 includes an operational amplifier IC1' having its non-invert input terminal biased to a voltage $\frac{1}{2} V_{cc}$ by connection to the connected ends of two equal resistors R2' and R3' connected in series between the rails 161 and 152. The invert input terminal of the amplifier IC1' is connected to the anode of a diode D1' having its cathode connected to the terminal Av of the sensor 15, a resistor R1' coupling the invert input terminal to the positive rail 161. The output terminal of the amplifier IC1' is the output terminal Bv of the circuit 163. The terminal Bv is coupled to the ground rail 162 by a series combination of a capacitor C2' and two resistors R4' and R5', a diode D3' being connected in parallel with the resistor R5' as shown and having its cathode connected to the base of an NPN switching transistor TR1' connected to a common point Cv at which a resistor R7' and a capacitor C3' are connected together, the resistor R7' and a resistor R6' in series therewith coupling the point Cv to the positive rail 161, and the capacitor C3' coupling the point Cv to the ground rail 162. An integrated circuit IC2' having pins 1 to 8 has its pins 2 and 6 connected to the point Cv, its pin 7 connected to the connected ends of the resistors R6' and R7', its pin 1 connected to the ground rail 162, its pins 4 and 8 connected to the positive rail 161, its pin 5 coupled by a capacitor C4' to the ground rail 162, and its pin 3 connected to a terminal Dv which is coupled to the positive rail 161 by two resistor R8' and R9' in series. The integrated circuit IC2' is a Signetics NE/SE555 timer and in the circuit 164 acts as an astable multivibrator whose characteristic operating time is determined by the values of the resistors R6' and R7' and the capacitor C3'.

An PNP switching transistor TR2' has its base connected to the connected ends of the resistor R8' and R9', its emitter connected to the positive rail 61, and its collector coupled by a series combination of a resistor R10', a diode D4' and a resistor R11' to the ground rail 162. A capacitor C5' is connected in parallel with the resistor R11'. The output terminal Ev of the timing circuit 164 is coupled to the collector of the transistor TR2' by the resistor R10'.

Figure 13:
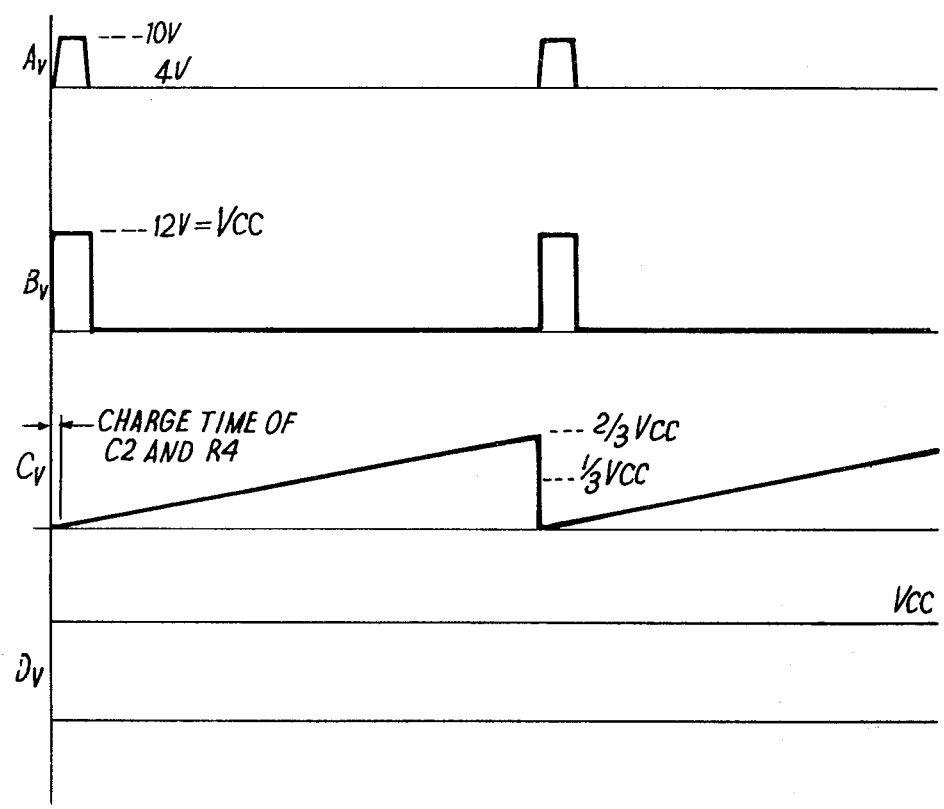

The integrated circuit IC2' operates such that the pin 3 is its output terminal. FIGS. 13 and 14 show the voltage waveforms which appear at the terminals and points Av, Bv, Cv, Dv, and Ev in FIG. 12 under different conditions.

In FIG. 13, the waveform at Av is that generated when the vehicle is moving at a speed greater than the first predetermined speed, e.g. 0.5 miles per hour. The amplifier IC1' amplifies the pulses in the waveform at Av to provide square pulses in the waveform at Bv. Assuming that the capacitor C2' is in a discharged condition immediately before a pulse at Bv the pulse causes the voltage $V_{cc}$ to be applied across the resistors R4' and R5' with the result that the transistor TR1' is biased into its on state and the capacitor C3' is rapidly discharged through the transistor TR1 and remains with zero volts across it until the capacitor C2' charges sufficiently for the voltage at the base of the transistor TR1' to bias the transistor TR1' off. The voltage at Cv then begins to rise as the capacitor C3' charges through the resistors R6' and R7'. The values of the resistors R6' and R7' and the capacitor C3 are chosen to be such that the voltage at Cv fails to reach $\frac{2}{3} V_{cc}$ before the leading edge of the succeeding pulse at Bv occurs if the speed of the vehicle is 0.5 miles per hour or greater. The voltage at the pin 3 and hence at Dv remains high at $V_{cc}$ if the voltage at Cv and hence at pin 2 remains below $\frac{2}{3} V_{cc}$.

The diode D3' protects the base-emitter junction of the transistor TR1' against damaging levels of reverse bias at the occurrence of the trailing edges of the pulses at Bv.

The transistor TR2' acts as an inverter so that the high voltage $V_{cc}$ at Dv results in zero volts at Ev.

FIG. 14 shows the result of a speed of less than 0.5 miles per hour. The voltage at Cv has sufficient time $t_1$ to reach $\frac{2}{3} V_{cc}$ with the result that the integrated circuit IC2' begins to operate as an astable multivibrator discharging the capacitor C3' internally to a voltage $\frac{1}{3} V_{cc}$ within a time $t_2$. The voltage at pin 2 and hence at Cv would rise to the voltage $\frac{2}{3} V_{cc}$ and fall again to $\frac{1}{3} V_{cc}$ repeatedly except for the occurrence of a succeeding pulse at Bv which discharges the capacitor C3' to zero. During the astable phase of discharge of the capacitor C3' from $\frac{2}{3} V_{cc}$ to $\frac{1}{3} V_{cc}$, the voltage at pin 3 and hence at Dv is at zero volts. Consequently, a thyristor gating impulse is produced at E during $t_2$ as shown in FIG. 14. If the movable switch contact 166 is at this time in contact with either of the fixed contacts 167 and 168, the thyristor SCR1' latches on and conducts until the switch 165 is opened by movement of the lever 23.

If the vehicle is stationary, no pulses occur at Bv, the integrated circuit IC2' operates as an astable multivibrator, and the thyristor SCR1' is supplied with gating impulses, so that the solenoid pairs B''' and D''' or A''' and C''' can be energised immediately.

If the movable switch contact 166 is moved quickly from one of the fixed contacts 167 and 168 to the other then the capacitor C6' maintains base current to the transistor TR5' for a long enough period for the transistors TR6' and TR7' not to become conducting. Consequently, the system can go straight from forward to reverse and vice versa and not dwell in neutral, provided that the vehicle speed is lower than the predetermined speed which determines the voltage at the point Ev.

The sensor 15 in the constructed embodiment produces pulses at Av in response to rotation of the universal joint 13 which in effect has two diametrically opposite regions of larger radius, relative to the axis of rotation, separated by two diametrically opposite regions of smaller radius. Pulses may also be produced in response to the passage of bolt heads in front of the sensor 15 if the sensor 15 is mounted close to a rotating flange coupling in the coupling between the output shaft of the transmission unit 12 and the differential gear 14.

I claim:

1. Control apparatus for the drive transmission of a vehicle, comprising: an input terminal for an electrical signal having a frequency representative of a rate of rotation, a manually operable direction switch, first switching means adapted to be so controlled in response to the said signal as to remain in one state thereof during each cycle of the said signal when the duration of the cycle is less than a predetermined duration, and to be settable in another state thereof by actuation of said direction switch when the duration of the said cycle is greater than the said predetermined duration, forward and reverse electrical actuators for selecting respectively forward and reverse drive, the direction switch being settable in one state for selecting the electrical actuator for forward drive and being settable in another state for selecting the electrical actuator for reverse drive, the first switching means being such that the said other state thereof enables setting of the direction switch to effect energization of the electrical actuator selected by the setting of the direction switch, second switching means adapted to be so controlled in response to the said signal as to be set into one state thereof in response to a cycle of the said signal when the duration of the said cycle falls below a second predetermined duration, and to be set into another state thereof when the duration of the said cycle increases to exceed a third predetermined duration, a low gear ratio electrical actuator and a high gear ratio electrical actuator, the second switching means being such as, in operation, to effect selectively energization of the low gear ratio electrical actuator and the high gear ratio electrical actuator respectively depending upon which one of the said two states of the second switching means prevails.

2. Control apparatus as claimed in claim 1, wherein the said second and third durations differ from one another in such a way that each change from energization of the low gear actuator to energization of the high gear actuator takes place when the said signal represents a higher rate of rotation than it does when each change from energization of the high gear actuator to energization of the low gear actuator takes place.

3. Control apparatus as claimed in claim 1, wherein the direction switch is settable in a third state in which means for maintaining a neutral condition of a drive transmission are operative, the neutral maintaining means including a neutral disabling electrical actuator adapted to be energized whenever the direction switch is in either of its first two states.

4. Control apparatus as claimed in claim 1, wherein the first switching means is adapted to respond to the said signal by the provision of first timing circuitry arranged to receive the said signal and to produce a triggering output conditional upon the durations of the cycles of the said signal.

5. Control apparatus as claimed in claim 1, wherein the second switching means is adapted to respond to the said signal by the provision of second timing circuitry arranged to receive the said signal and to produce an output signal of a first magnitude for holding the second switching means in the said one state, or of a second magnitude for holding the second switching means in the other state thereof.

6. Control apparatus as claimed in claim 1, wherein the second timing circuitry includes feedback means for controlling a timing constant of the second timing circuitry so as to cause the changes from the first magnitude of the said output signals to the second magnitude thereof to take place in response to a change in duration of the first said signal which is different from the change in the durations of the said cycles at which a change from the second magnitude to the first magnitude takes place.

7. Control apparatus as claimed in claim 1, wherein the drive transmission is a hydraulically actuated drive transmission, and the said electrical actuators are the respective solenoids of corresponding electrically actuated two-way switching values for the hydraulic fluid.

8. Control apparatus as claimed in claim 7, wherein piston units are arranged to be controlled by hydraulic fluid in a circuit including the said valves.

* * * * *